United States Patent
Dihel et al.

(10) Patent No.: US 7,794,766 B2
(45) Date of Patent: Sep. 14, 2010

(54) OIL MODIFIER TO LOWER FAT CONTENT OF FRIED FOODS

(75) Inventors: Deborah L. Dihel, Whitehouse Station, NJ (US); Cielito S. Baytan, Bloomfield, NJ (US)

(73) Assignee: Brunob II B.V., Arnhem (NL)

(*) Notice: Subject to any disclaimer, the term of this patent is extended or adjusted under 35 U.S.C. 154(b) by 1096 days.

(21) Appl. No.: 11/486,585

(22) Filed: Jul. 14, 2006

(65) Prior Publication Data

US 2007/0048427 A1    Mar. 1, 2007

Related U.S. Application Data

(60) Provisional application No. 60/711,236, filed on Aug. 25, 2005.

(51) Int. Cl.
*A23L 1/00* (2006.01)
*A23P 1/08* (2006.01)

(52) U.S. Cl. .................... 426/438; 426/302

(58) Field of Classification Search .......... 426/601, 426/438–441
See application file for complete search history.

(56) References Cited

U.S. PATENT DOCUMENTS

| | | | | |
|---|---|---|---|---|
| 4,188,410 A | * | 2/1980 | Rispoli et al. ........ | 426/296 |
| 4,504,509 A | * | 3/1985 | Bell et al. ........... | 426/549 |
| 4,510,166 A | * | 4/1985 | Lenchin et al. ....... | 426/565 |
| 4,968,518 A | | 11/1990 | Lopez | |
| 5,279,840 A | * | 1/1994 | Baisier et al. ........ | 426/102 |
| 6,224,921 B1 | * | 5/2001 | Shih et al. ........... | 426/94 |
| 6,787,170 B2 | * | 9/2004 | Lonergan et al. ...... | 426/94 |
| 2003/0026887 A1 | | 2/2003 | Gertz | |
| 2004/0067282 A1 | | 4/2004 | Karwowski et al. | |

FOREIGN PATENT DOCUMENTS

| | | |
|---|---|---|
| CA | 2442249 | 4/2004 |
| EP | 1 430 788 A1 | 6/2004 |
| EP | 1 510 139 A1 | 3/2005 |
| JP | 07079700 | 3/1995 |
| JP | 2003-219827 | 1/2002 |
| JP | 20033265107 | 9/2003 |
| WO | WO 02/066587 | 8/2002 |

* cited by examiner

*Primary Examiner*—Carolyn A Paden
(74) *Attorney, Agent, or Firm*—Karen G. Kaiser

(57) ABSTRACT

This patent pertains to a method of mixing at least one oil with an effective absorption lowering amount of a modified starch to form a mixture; and frying a food portion in the mixture. The patent also pertains to the resulting fried food portion which has a reduced oil content while maintaining acceptable taste, texture, and appearance.

13 Claims, No Drawings

OIL MODIFIER TO LOWER FAT CONTENT OF FRIED FOODS

This application claims priority to provisional application U.S. Ser. No. 60/711,236 filed 25 Aug., 2005.

BACKGROUND OF THE INVENTION

The present invention relates to an oil containing an effective absorption lowering amount of a modified starch and a method of preparing fried foods with a reduced fat content.

Fried foods, such as french fries and chicken nuggets, are commonplace in the diet. However, due to health and dietary concerns, many people have reduced or even eliminated fried foods from their diet.

Reduced oil fried food compositions are known in the market. However, many of these suffer in taste, texture and/or appearance. Reduced oil products are often produced by baking, instead of frying, or frying for a more limited amount of time. Reduced oil products may also be produced by coating the product, for example with hydrocolloids, to prevent oil absorption. Despite the advances in this field, there remains a need for fried food products, which have a reduced oil content, yet remain organoleptically similar to fried foods which do not have a reduced oil content.

Surprisingly, it has now been discovered that reduced oil fried foods with acceptable taste, texture and appearance may be achieved by frying in oil containing an effective absorption lowering amount of a modified starch.

SUMMARY OF THE INVENTION

This patent pertains to a method of mixing at least one oil with an effective absorption lowering amount of a modified starch to form a mixture; and frying a food portion in the mixture. The patent also pertains to the resulting fried food portion which has a reduced oil content while maintaining acceptable taste, texture, and appearance.

As used herein, oil is intended to include any oil or fat which may be used to fry a food product.

As used herein, effective absorption lowering amount is an amount sufficient to reduce the percent fat in the fried food product by at least 0.5% by weight using the formula:

$$\% \text{ Fat Reduction} = \frac{\left(\begin{array}{c}\% \text{ fat in control product} - \\ \% \text{ fat in the experimental product}\end{array}\right)}{\% \text{ fat in control product}}$$

As used herein, fried means fried or par-fried.

DETAILED DESCRIPTION OF THE INVENTION

This patent pertains to a method of mixing at least one oil with an effective absorption lowering amount of a modified starch to form a mixture; and frying a food portion in the mixture. The patent also pertains to the resulting fried food portion which has a reduced oil content while maintaining acceptable taste, texture, and appearance.

Any oil suitable for frying a food product may be used in this invention, including without limitation those which are vegetable derived, animal derived, and marine derived. Included oils include hard edible fats such as palm oil, which are liquids at the frying temperature and modified fats such as hydrogenated fats. Illustrative oils include without limitation, those derived from sesame seed, rice, rice germ, canola, coconut, corngerm, cotton seed, olive, palm, peanut, rapeseed, safflower, soy bean, sunflower, lard and tallow. Illustrative oils also include trans-reduced or trans-free oils such as high oleic—low linolenic oils.

The modified starch may be derived from any native source, any of which may be suitable for use herein. Also suitable are starches derived from a plant obtained by standard breeding techniques including crossbreeding, translocation, inversion, transformation or any other method of gene or chromosome engineering to include variations thereof. In addition, starch derived from a plant grown from artificial mutations and variations of the above generic composition, which may be produced by known standard methods of mutation breeding, are also suitable herein.

Typical sources for the starches are cereals, tubers, roots, legumes and fruits. The native source can be varieties of corn (maize), pea, potato, sweet potato, banana, barley, wheat, rice, oat, sago, amaranth, tapioca (cassava), arrowroot, canna, and sorghum, as well as low amylose and high amylose varieties thereof. As used herein, the term "waxy" or "low amylose" starch is intended to include a starch containing no more than about 10% amylose by weight of the dry starch and in one embodiment contains less than 5% amylose, in another embodiment less than 3%, and in yet another embodiment less than 1% amylose. As used herein, the term "high amylose" is intended to include a starch containing at least about 50% amylose, in another embodiment at least about 70%, in yet another embodiment at least about 80%, and in a further embodiment, at least about 90% amylose by weight of the dry starch. In one embodiment, the starch source is corn starch.

The starch is derivatized (modified) by treatment with any reagent or combination of reagents which contributes hydrophobicity to the starch. The reagent must contain a hydrophobic moiety and may contain a hydrophilic moiety. In one embodiment, the hydrophobic moiety is an alkyl or alkenyl group which contains at least five carbon atoms, or an aralkyl or aralkenyl group which contains at least six carbon atoms, and up to about twenty-four carbon atoms. If a hydrophilic moiety is present, it may be contributed by the reagent or the starch's own hydroxyl groups may serve as the hydrophilic moiety and the reagent may contribute only the hydrophobic moiety.

Any process for derivatizing starch which yields the desired hydrophobic functionality of the starch molecule and thereby yields a starch which is effective at lowering oil absorption during frying may be used to prepare the modified starch of the present invention. Suitable derivatives and methods for producing them are known in the art and disclosed, for example, in U.S. Pat. No. 4,626,288 which is incorporated herein by reference. In one embodiment, the starch is derivatized by reaction with an alkenyl cyclic dicarboxylic acid anhydride by the method disclosed in U.S. Pat. Nos. 2,613,206 and 2,661,349, incorporated herein by reference. In another embodiment, the starch is derivatized by reaction with octenylsuccinic anhydride or dodecenylsuccinic anhydride and in still another by reaction with octenylsuccinic anhydride. In yet another embodiment, the starch is derivatized by reaction with octenylsuccinic anhydride at a level of from 2-3%.

The starch may optionally be converted, either prior to or after hydrophobic modification, including fluidity or thin-boiling starches prepared by oxidation, enzyme conversion such as α-amylase conversion, mild acid hydrolysis and/or heat dextrinization, and combinations thereof. Methods of conversion are well known in the art, for example, see Rutenberg, "Starch and Its Modifications," *Handbook of Water-Soluble Gums and Resins*, Davidson, Editor, McGraw-Hill, Inc., New York, N.Y. 1980, pp. 22-36. In one embodiment, the conversion is carried out before treatment with a hydrophobic reagent.

The starch is mixed into the oil in an effective absorption lowering amount. In one embodiment, the starch is added at a level of from 0.5 to 3%, and in another embodiment at a level of from about 1 to 2%, by weight of the oil.

Other additives commonly used in the art may be included in the oil, including without limitation antioxidants such as TBHQ, gallium compounds, BHA, BHT, silicons, tocopherols, ginger oil extracts, sage oil extracts, and rosemary extracts; stabilizers such as Miroil fry powder (perlite, water, and citric acid) and water soluble carboxylic acids; reducing sugars; and emulsifiers.

The fried food may be any edible product which is to be fried, including fish, meat, poultry or meat-substitute portions such as fish stix and chicken nuggets, cheese such as mozzarella sticks, breads, snack products such as potato chips and corn chips, and fruits and vegetables including onions, zucchini, carrots, eggplant, apples and potatoes. In one embodiment, the fried food is a vegetable and in another embodiment, potatoes. In yet another embodiment, the fried food is a snack product.

The food portion is first prepared for coating. For example, a vegetable is typically cleaned, optionally peeled, and may be cut into strips or other shapes. Potatoes may be cut into strips of the desired size and shapes for french fries, including without limitation shoestring potatoes, crinkle cuts, and straight cuts. The vegetables are optionally blanched according to conventional procedures to inactivate enzymes, gelatinize naturally occurring starches, remove excess free sugars to reduce Maillard browning, and/or par-cook the vegetable. Typically the vegetables are blanched by immersion in water at a temperature of from about 70 to about 99° C. or exposure to steam (at ambient or higher pressures) for about 2 to about 15 minutes, depending upon the amount of blanching desired. The vegetable is then dried.

The food portion may be breaded and/or batter coated with either single or multiple coatings. The batter coating is typically applied by using a high solids starch dispersion, such as a dispersion with a solids content of at least about 30% by weight. Excess starch may be blown off. In one embodiment, the coating is a thin coating, such as that used on fried potato products.

The food is fried in the oil using processes, times and temperatures known in the art. If par-fried, the par-fried food product may be finished by frying or any other method known in the art, including convection or conduction heating such as in an oven. The fried food may also be frozen for later frying or finishing, either with or without par-frying, using techniques known in the art.

The resultant fried foods contain a reduction of fat of at least about 0.5% by weight using the formula:

$$\% \text{ Fat Reduction} = \frac{\left( \begin{array}{c} \% \text{ fat in control product} - \\ \% \text{ fat in the experimental product} \end{array} \right)}{\% \text{ fat in control product}}$$

In one embodiment, the fried food has a reduction of at least 5%, in another at least 8%, and in a third at least 10%, fat by weight of the fried food. In one embodiment, fat reduction is improved for longer frying periods, in comparison with product fried in oil without the starch additive. Additional fat reduction may be achieved using methods known in the art, including without limitation use of hydrocolloid coatings.

The fried food has similar organoleptic properties to the regular fat content fried food, including color, texture, mouth feel, bite, gloss and appearance. Some foods fried in oil with modified starch have a more uniform color and appearance than those fried in oil alone.

EXAMPLES

The following examples are presented to further illustrate and explain the present invention and should not be taken as limiting in any regard. All percents used are on a weight/weight basis.

The following test procedures are used throughout the examples:

Fat (Oil) Content—Total fat content was determined using supercritical carbon dioxide extraction in the LECO TFE 2000 (Leco Corporation, St Josephs Mich.). Fried Foods samples were frozen after final frying for a minimum of 12 hours. Frozen samples were macerated in a Waring blender. Fat analysis was performed in duplicate and reported as % w/w on a wet solids basis.

Percent Fat Reduction—Percent fat reduction is determined by the following formula:

$$\% \text{ Fat Reduction} = \frac{\left( \begin{array}{c} \% \text{ fat in control product} - \\ \% \text{ fat in the experimental product} \end{array} \right)}{\% \text{ fat in control product}}$$

Example 1

Preparation of Reduced Oil French Fries

Fresh potatoes were rinsed, peeled, and sliced into 0.375 inch (9.5 mm)×0.375 inch (9.5 mm)×3 inch strips. The potato strips were then rinsed in cold water to remove starch and sugars. The strips were blanched at 70°-75° for 11 minutes and dried to a moisture loss of about 13-16% by weight. 1% starch was added directly to the hot frying oil. The strips were then par-fried in the starch spiked vegetable oil at 365° C. for 45 seconds and frozen at −20° C. The frozen dual coated strips were finished by frying at 365° C. for 2 minutes and 30 seconds in the same starch containing oil. The following starches were used: Starch 1—Native Potato Starch (Commercially Available from Emsland)

Starch 2—waxy corn starch modified with octenyl succinic anhydride at a level of 2.4% and co-drum dried with corn syrup solids in a ratio of 80:20

Starch 3—waxy corn starch modified with octenyl succinic anhydride at a level of 3%

Starch 4—corn starch modified with octenyl succinic anhydride at a level of 2%

Starch 5—dextrinized waxy corn starch modified with octenyl succinic at a level of 3%

The results are shown in Table 1 below.

TABLE 1

| Sample | % Fat | % Fat reduction | Starch in Oil Condition |
|---|---|---|---|
| Control (no starch added) | 10.5 | n/a | Clear |
| Starch 1 | 10.4 | 0 | Burnt and settled down |
| Starch 2 | 10.26 | 2.29 | Burnt quickly, did not disperse well, no cloudiness |
| Starch 3 | 8.49 | | Cloudy |
| Starch 4 | 8.23 | | Cloudy |
| Starch 5 | 8.77 | | Cloudy and dispersed |

In terms of handling, Starches 3, 4 and 5 did not cause difficulty in frying. Fries were good in texture, with smooth surface and no blisters, and just as crisp as the controls.

Example 2

Effect of Adding Starch in the Par-Fry

The effect of adding starch to the par-fry was evaluated (oil was not saved for final frying). The results are reported in Table 2, below.

TABLE 2

| Sample | % Fat | % Fat reduction |
|---|---|---|
| Control (no starch added) | 10.5 | — |
| Starch 5 at 1% | 10.5 | 0 |

Starch 5 was not effective in reducing fat when present in par-frying oil only at a level of 1%.

Example 3

Effect of Temperature

In the next experiment, % fat reduction achieved by adding Starch 5 to oil at different temperatures was evaluated. Starch 5 was added to the par-fry oil at 250° F. (121.1° C.) and 365° F. (185° C.). Fat results reported are an average of two replicates.

Table 3 shows the results.

TABLE 3

Effect of temperature (oil saved for final frying)

| Temperature | % Fat Average | % Fat Reduction |
|---|---|---|
| 365 F. (185° C.) | 8.24 | 21.52 |
| 365 F. (185° C.)) | 8.26 | 21.33 |
| 250 F. (121.1° C.) | 8.51 | 18.95 |
| 250 F. (121.1° C.) | 8.27 | 21.24 |

Adding Starch 5 at different temperatures did not significantly affect its ability to reduce fat.

Example 4

Sliced Potato Chips

1. Potatoes were sliced to about 1-1.5 mm thick and blanched for 1 minute at 190° F. (87.8° C.). The slices were then shocked with cold water (~33° F. or 0.6° C.) for 30 seconds. The slices were dried at room temperature (~24° C.) by putting the chips (slices), singly on paper towel for 25 minutes after blanching. 2% Starch 4 or 5 was added to the hot oil with stirring and then the chips were fried in a deep fryer at 350° F. (176.7° C.) for 1 minute and 35 seconds (about 0.25 lb or 113.4 grams per basket). Repeat. The samples were cooled to room temperature and frozen at −30° C. overnight for fat analysis.

| Sample | % Fat Reduction (Average of 2 runs) |
|---|---|
| 2% Starch 5 | 8.8 |
| 2% Starch 4 | 11.5 |

As French fries are fried longer than potato chips, it appears that greater fat reduction is achieved in applications when fried for longer time periods.

We claim:

1. A method comprising:
    a) mixing at least one oil with an effective oil absorption lowering amount of a modified starch to form a mixture; and
    b) frying a food portion in the mixture
    wherein the starch is modified with an alkenyl cyclic dicarboxylic acid anhydride.

2. The method of claim 1, wherein the starch is modified with a reagent selected from the group consisting of an octenylsuccinic anhydride, a dodecenylsuccinic anhydride, and combinations thereof.

3. The method of claim 2, wherein the starch is modified with an octenylsuccinic anhydride.

4. The method of claim 1, wherein the starch is in an amount of from 0.5 to 3% by weight of the oil.

5. The method of claim 4, wherein the starch is in an amount of from about 1 to 2% by weight of the oil.

6. The method of claim 1 further comprising blanching in water and/or coating the food portion prior to frying.

7. The method of claim 1, wherein the frying is par-frying and further comprising freezing the par-fried food portion to form a frozen food portion.

8. The method of claim 7, further comprising reconstituting the frozen food portion.

9. The method of claim 8, wherein reconstitution is by frying.

10. The method of claim 8, wherein reconstitution is by oven heating.

11. The fried food portion prepared using the method of claim 8.

12. The fried food portion prepared using the method of claim 7.

13. The fried food portion prepared using the method of claim 1.

* * * * *